US008090611B2

(12) United States Patent
Hodges et al.

(10) Patent No.: US 8,090,611 B2
(45) Date of Patent: Jan. 3, 2012

(54) SYSTEM, METHOD, AND COMPUTER PROGRAM PRODUCT FOR ENABLING WORKFLOW APPLICATIONS

(75) Inventors: Brian Hodges, Fall City, WA (US); Colin Kinahan, Calgary (CA); Simon Orrell, Canmore (CA); Thomas W. Denny, Tigard, OR (US); Rick R. Roth, Tucson, AZ (US); Christian Stephens, Lake Oswego, OR (US); Thomas Brooks, Seattle, WA (US); Scott Ian Tattrie, Calgary (CA); Marvin Keith Lum, Calgary (CA); Kirk Slone, Calgary (CA); Eric Jobin, Calgary (CA); Daren Yong, Calgary (CA)

(73) Assignee: Open Text S.A., Grand Duchy (LU)

( * ) Notice: Subject to any disclaimer, the term of this patent is extended or adjusted under 35 U.S.C. 154(b) by 0 days.

(21) Appl. No.: 12/703,531

(22) Filed: Feb. 10, 2010

(65) Prior Publication Data

US 2011/0137702 A1    Jun. 9, 2011

Related U.S. Application Data

(63) Continuation of application No. 11/669,662, filed on Jan. 31, 2007, now abandoned.

(60) Provisional application No. 60/763,681, filed on Jan. 31, 2006, provisional application No. 60/800,056, filed on May 12, 2006, provisional application No. 60/799,804, filed on May 12, 2006.

(51) Int. Cl.
*G06Q 10/00*    (2006.01)
(52) U.S. Cl. ...................... 705/7.27; 705/7.13; 705/7.14

(58) Field of Classification Search ................. 705/7.13, 705/7.14, 7.27
See application file for complete search history.

(56) References Cited

U.S. PATENT DOCUMENTS

| 5,826,239 | A | * | 10/1998 | Du et al. | ...................... 705/7.26 |
| 6,330,006 | B1 | | 12/2001 | Goodisman | |
| 6,339,838 | B1 | * | 1/2002 | Weinman, Jr. | ................ 717/104 |
| 6,415,259 | B1 | | 7/2002 | Wolfinger et al. | |

(Continued)

FOREIGN PATENT DOCUMENTS

WO    WO2007090161    8/2007

OTHER PUBLICATIONS

Continuous Business Process Management with HOLOSOFX BPM Suite and IBM MQSeries Workflow, ibm.com/redbooks, May 2002, p. 1-534.*

(Continued)

*Primary Examiner* — Justin M Pats
(74) *Attorney, Agent, or Firm* — Sprinkle IP Law Group

(57) ABSTRACT

A facility is described for enabling workflow applications. The facility receives a request to identify an optimized resource list that identifies resources capable of performing a workflow process task. The workflow process task can be associated with a document type relating to a document associated with a workflow envelope. The workflow envelope can store multiple documents of at different document types. The facility includes a workflow engine and a simulation engine. The workflow engine performs workflow process tasks based on the tasks identified in the workflow envelope. The simulation engine can employ modeling and historical data from a workflow metrics data source to generate the optimized resource list and identify identifying resources matching the workflow process tasks identified in the workflow envelope.

20 Claims, 9 Drawing Sheets

U.S. PATENT DOCUMENTS

| | | | |
|---|---|---|---|
| 6,429,880 | B2 | 8/2002 | Marcos et al. |
| 6,437,805 | B1 | 8/2002 | Sojoodi et al. |
| 6,553,563 | B2 | 4/2003 | Ambrose et al. |
| 6,714,219 | B2 | 3/2004 | Lindhorst et al. |
| 6,745,221 | B1 | 6/2004 | Ronca |
| 6,874,146 | B1 | 3/2005 | Iyengar |
| 6,938,240 | B2 * | 8/2005 | Charisius et al. ............. 717/104 |
| 6,990,654 | B2 | 1/2006 | Carroll, Jr. |
| 7,017,123 | B2 | 3/2006 | Chickles et al. |
| 7,124,373 | B1 | 10/2006 | Patil |
| 7,134,090 | B2 | 11/2006 | Kodosky et al. |
| 7,159,185 | B1 | 1/2007 | Vedula et al. |
| 7,194,692 | B2 | 3/2007 | Marcos et al. |
| 7,657,827 | B2 * | 2/2010 | Sanabria et al. ............. 715/200 |
| 7,810,099 | B2 * | 10/2010 | Dettinger et al. ............. 718/106 |
| 2001/0045963 | A1 | 11/2001 | Marcos et al. |
| 2002/0029376 | A1 | 3/2002 | Ambrose et al. |
| 2002/0078432 | A1 * | 6/2002 | Charisius et al. ............. 717/102 |
| 2002/0085020 | A1 | 7/2002 | Carroll, Jr. |
| 2002/0165912 | A1 | 11/2002 | Wenocur et al. |
| 2003/0093433 | A1 | 5/2003 | Seaman et al. |
| 2004/0250213 | A1 | 12/2004 | Shalabi et al. |
| 2005/0015746 | A1 | 1/2005 | Shukla et al. |
| 2005/0066287 | A1 | 3/2005 | Tattrie et al. |
| 2005/0066304 | A1 | 3/2005 | Tattrie et al. |
| 2005/0262429 | A1 | 11/2005 | Elder et al. |
| 2005/0273507 | A1 | 12/2005 | Yan et al. |
| 2005/0283786 | A1 * | 12/2005 | Dettinger et al. ............. 718/104 |
| 2006/0015873 | A1 | 1/2006 | Dettinger et al. |
| 2006/0047665 | A1 | 3/2006 | Neil |
| 2006/0085342 | A1 | 4/2006 | Chen et al. |
| 2006/0224432 | A1 * | 10/2006 | Li ..................................... 705/9 |
| 2007/0061695 | A1 * | 3/2007 | Sanabria et al. ........... 715/501.1 |
| 2007/0074121 | A1 | 3/2007 | Mullender et al. |
| 2007/0245302 | A1 | 10/2007 | Grotjohn et al. |
| 2011/0023049 | A1 * | 1/2011 | Dettinger et al. ............. 718/105 |

OTHER PUBLICATIONS

Schmidt, Building Workflow Business Objects, OOPSLA '98 Business Object Workshop IV, 1998, p. 1-14.*

Gannon et al., A Quick Tour of LEAD via the LEAD Portal & Application Orchestration, Indiana University, Jul. 21-22, 2005, p. 1-46.*

Senkul and Torosola, An Architecture for workflow scheduling under resource allocation constraints, Information Systems 30 (2005), p. 399-422.*

Castellanos et al., iBOM: A Platform for Intelligent Business operation Management, Proceedings of the 21st International Conference on Data Engineering, 2005, p. 1-12.*

Nielsen et al., Using Domino Workflow, IBM, May 2000, p. 1-319.*

Dan, et al., "Web Services on demand: WSLA-driven automated management," IBM Systems, Journal, vol. 43, No. 1, 2004, pp. 136-158.

International Search Report and Written Opinion issued in International Patent Application No. PCT/US07/68825, mailed Jul. 17, 2008, 10 pages.

Office Action issued in U.S. Appl. No. 11/669,662, mailed Dec. 1, 2008, 23 pages.

Schmidt, "Building Workflow Business Objects," OOPSLA '98 Business Object Workshop IV, 1998, p. 1-14.

Gannon et al., "A Quick Tour of LEAD via the LEAD Portal & Application Orchestration," Indiana University, Jul. 21-22, 2005, pp. 1-46.

Senkul and Torosola, "An Architecture for workflow scheduling under resource allocation constraints," Information Systems 30 (2005), pp. 399-422.

Castellanos et al., "iBOM: A Platform for Intelligent Business Operation Management," Proceedings of the 21st International Conference on Data Engineering, 2005, pp. 1-12.

Office Action issued in U.S. Appl. No. 11/669,662, mailed Aug. 10, 2009, 16 pages.

International Search Report issued in International Patent Application No. PCT/US07/61391, mailed Feb. 28, 2008, 3 pages.

Written Opinion issued in International Patent Application No. PCT/US07/61391, mailed Feb. 28, 2008, 6 pages.

International Preliminary Report on Patentability issued in International Patent Application No. PCT/US07/61391, mailed Jul. 23, 2008, 7 pages.

International Preliminary Report on Patentability issued in International Patent Application No. PCT/US07/68825, mailed May 9, 2009, 7 pages.

Extended European Search Report issued for European Patent Application No. 07 710 433.9, mailed Feb. 22, 2011, 7 pages.

Examiner's Report issued in Canadian Patent Application No. 2,640,739, dated Mar. 9, 2011, 2 pages.

Office Action issued in U.S. Appl. No. 12/353,849, mailed Jun. 7, 2011, 14 pages.

Captaris, "Captaris Delivers Workflow Business Solutions," White paper, 2004, pp. 1-8.

* cited by examiner

FIG. 8

SYSTEM, METHOD, AND COMPUTER PROGRAM PRODUCT FOR ENABLING WORKFLOW APPLICATIONS

CROSS-REFERENCE(S)

This patent application is a continuation of U.S. patent application Ser. No. 11/669,662, entitled WORKFLOW APPLICATIONS and filed on Jan. 31, 2007, which claims the benefit of the assignee's U.S. Provisional Patent Application Ser. No. 60/763,681, entitled "Workflow Application" and filed on Jan. 31, 2006; U.S. Provisional Patent Application No. 60/800,056, entitled "Data Binding For Workflow" and filed on May 12, 2006; and U.S. Provisional Patent Application No. 60/799,804, entitled "Workflow Simulator" and filed on May 12, 2006, which are hereby incorporated herein in their entireties by reference.

BACKGROUND

Computers have been networked to exchange data between them for decades. One important network, the Internet, comprises a vast number of computers and computer networks interconnected through communication channels. The Internet is used for a variety of reasons, including electronic commerce, exchanging information such as electronic mail, retrieving information and doing research, and the like. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special purpose application program for requesting and displaying web pages.

Currently, web pages are often defined using HyperText Markup Language ("HTML"). HTML provides a standard set of tags that define how a web page is to be displayed. When a user makes a request to the browser to display a web page, the browser sends the request to the server computer system to transfer to the client computer system an HTML document that defines the web page. When the requested HTML document is received by the client computer system, the browser displays the web page as defined by the HTML document. The HTML document contains various tags that control the display of text, graphics, controls, and other features. The HTML document may contain URLs of other web pages available on that server computer system or on other server computer systems.

New protocols exist, such as Extensible Mark-up Language ("XML") and Wireless Access Protocol ("WAP"). XML provides greater flexibility over HTML. WAP provides, among other things, the ability to view web pages over handheld, wireless devices, such as cell phones and portable computers (e.g. PDA's). All of these protocols provide easier ways to provide information to people via various data processing devices. Many other protocols and means for exchanging data between data processing device continue to develop to further aid the exchange of information.

Computer networks can be employed to create and track workflows, such as by using workflow applications. Workflow applications manage or track documents and/or tasks through one or more workflow processes. Multiple people, components, and documents may be involved in completing a workflow process. Many workflow applications conventionally associate a single document with a workflow. As an example, a workflow application may associate a purchase order with one workflow and an invoice with a different, separate workflow, even though these workflows may be related. The purchase order and invoice may have different document types. As an example, the purchase order may be a word-processing document and the invoice may be a spreadsheet file.

BRIEF DESCRIPTION OF THE DRAWINGS

FIG. 8 is a user interface diagram illustrating a user interface associated with a workflow application.

DETAILED DESCRIPTION

Figure 1:
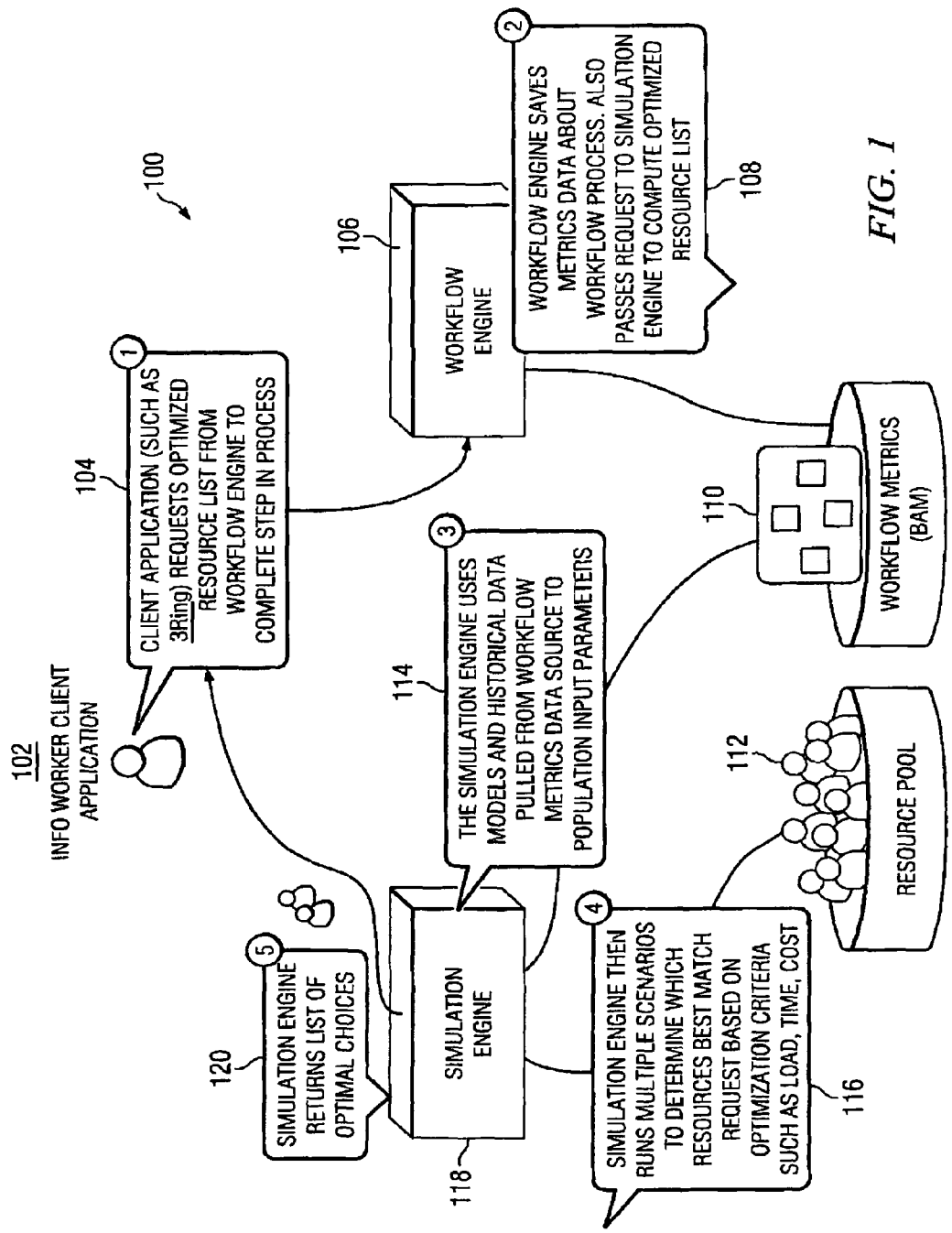
FIG. 1 is a flow diagram illustrating use of a simulation engine with a workflow engine in various embodiments.

A workflow facility ("facility") for handling workflow processes is described. In various embodiments, the facility enables multiple document types to be associated with a workflow envelope. The workflow envelope associates primary documents, supporting documents, metadata, navigation interfaces, information search interfaces, workflow process management tools, metadata management tools, and other information, such as decision-making criteria a user provides. Documents can be dynamic or static. A dynamic document is a document that is dynamically created based on data stored outside the document. A workflow envelope can contain no documents in some cases, such as when designing or testing workflow applications.

The workflow envelope can accumulate objects, such as documents, data, and metadata relating to the documents. The workflow envelope can accumulate these objects under user control or based on inputs received by a workflow application. Thus, the workflow envelope can accumulate documents in a single environment in the context of performing a specific workflow operation. As an example, when a workflow process involves reviewing and approving a document based on business criteria, the workflow envelope can contain data to cause the document to be routed to an appropriate person, enable that person to modify some portions of the document but not others, store information from the document into a database, and so forth.

The facility can define a workflow envelope using an extensible markup language ("XML"), a predefined document collection object, references to existing documents, or a combination thereof. The workflow envelope is compatible with various operating systems, such as MICROSOFT WINDOWS or LINUX, and computing devices, such as client computing devices, server computing devices, and so forth. In some embodiments, a web service may provide workflow envelope services. Thus, an envelope can store workflow information such that a workflow application can determine workflow process interactions without resorting to executable components, such as dynamic link libraries. The following provides an example XML schema for a workflow envelope:

```
<Workflow definition>
    .... normal workfow specification
        <Document Envelope>
            <Documents>
                <Document ID="" Name="" Date="">
                    ......content
                <Document>
            </Documents>
        </Document Envelope>
</Workflow definition>
```

Workflow tasks defined for a workflow envelope operate on documents in the workflow envelope, whether to just carry the documents to the next workflow task, or to modify the documents based on user input or some external set of conditions. Workflow envelopes may also have security attached to them so that they encrypt documents they contain, so that only those users with the appropriate credentials are allowed to open the documents. Once a user's access credentials are determined or verified and the user's role and task are defined, a component of the facility can communicate with a data source that propagates the workflow envelopes. The data source can provide forms, templates, and so forth. The component can direct the workflow based on form type or other identifier indicated in a header section of the pertinent workflow envelope. The component can set document disposition options in a document viewing pane and display the status of the workflow in a workflow pane. These panes are sections of windows providing graphical user interfaces associated with the facility.

Components associated with the facility can retrieve information relating to workflows from a data source of pre-defined workflow forms and templates which propagates one or more individual workflow envelopes; direct workflow processes based on the type of document or form, or other identifier contained in the header section of the workflow envelope; set document disposition options on the document viewing page; and provide access to documents and data using a set of design canvases or application displays. Examples of design canvasses include an image or document viewer, a metadata/search canvas, and a workflow deployment and management canvas. The facility employs the image or document viewer design canvas to display the contents of documents, the metadata/search canvas to search for, display, or receive metadata relating to documents, workflow processes, and workflow envelopes. The components can also provide a development environment in which data sources and design tools for business applications can be used interactively with the viewer, metadata, and workflow canvases; facilitate development of workflow processes by enabling a drag and drop design canvas, inspection of data and program objects, and automated synchronization of changes in the workflow; enable access to multiple documents and data sources in a single, unified development environment; and provide a deployment environment for workflow applications by asserting constraints on the workflow environment at runtime, based on a user's role or rights that can be assigned programmatically.

Conventionally, workflow applications are designed in one environment and deployed using another. Developers or users may employ different programming paradigms to design workflow applications than to deploy them. The facility unifies these disparate software design and programming paradigms. The facility can provide a unified environment that enables users to develop, deploy, and use workflow applications. Thus, this unified environment can provide features for document viewing, workflow process design and control, and characterization and application of metadata (or data) in the workflow.

This unified environment can contain tools for workflow design and runtime deployment, and integrates with other deployment environments, such as Microsoft® SharePoint, and with third party development environments, such as Microsoft® Visual Studio. The workflow environment can accomplish this by using standards, such as XML, and by managing all of the viewer, metadata and data sources, and workflow processes, rather than by relying on custom programming of those third party deployment environments. Thus, the facility achieves rapid development of business process management (BPM) packages for multiple documents and workflow tasks in a single, unified environment.

This results in a development and workflow deployment framework which may selectively create, read, update and delete data from external databases, such as an Oracle® 9i data store; selectively integrate (send and receive information) with middleware products, such as IBM MQ; store and retrieve documents (including images); parse XML files (such as authorization requests); integrate with external document services, such as those on an outbound fax server; and provide document-centric data operations, such as mail-merge functionality using letter or document templates.

Simulation Engine and Workflow Application

The workflow envelope is a working environment which also may be used interactively with a simulation engine as one of its components. Such a simulation engine may be used to model the workflow process to adapt, modify or otherwise control the workflow, such as in a predictive manner. Typically, such a simulation engine can evaluate environmental and task performance conditions and adapt the workflow to avoid errors or delays; optimize the workflow process; or function as a software and BPM design and testing tool to detect and correct errors in workflow applications, such as be used during interactive use with design canvases. The simulation engine can function as a service to provide optimization of resource information (including without limitation tasks such as user load balancing, task prioritization, choice optimization) using constraints, such as time, cost, or availability based on data provided by Business Activity Monitor (BAM) metrics. Resources can include hardware, software, people, and so forth. Such metrics can be stored and queried from an On Line Analytical Processing (OLAP) data cube. The simulation engine can determine that a particular type of task (e.g., document type) is backlogged and attempt to identify that additional resources may be required. The simulation engine can also predict resource availability, such as based on historical productivity or efficiency of a resource or schedule for the resource. As an example, a first data entry clerk may work from 8:00 a.m. to 4:00 p.m. and may be able to handle a task in 25 minutes, but a second data entry clerk may work from 7:00 a.m. to 12:00 p.m. and may be able to handle a task in 15 minutes. The simulation engine can analyze the availability of these resources to predict that an additional data entry clerk may be required at an identified time.

Integration of the simulation engine may take the form illustrated in FIG. 1. FIG. 1 is a flow diagram illustrating use of a simulation engine with a workflow engine in various embodiments. In illustrated embodiment, the simulation engine returns a list of optimal choices or settings that may be processed by the workflow application.

According to the illustrated embodiment, a client application 102 requests 104 an optimized resource list from a workflow engine 106 to complete a step in a workflow process. The workflow engine 106 saves 108 metrics about the workflow process, such as in a workflow metrics store 110, and provides the request 104 the client application generates to a simulation engine 118 to compute the optimized resource list. The workflow metrics store 110 may include BAM metrics. The simulation engine 118 employs 114 models and historical data from a workflow metrics data source to populate for the workflow. The simulation engine 118 then runs 116 multiple scenarios to determine which resources of a resource pool 116 best match the request based on various optimization criteria, such as load, time, cost, and so forth. The simulation engine then returns 120 the list of potential choices.

Information returned from the simulation can be used to test a workflow application, optimize a workflow at runtime dynamically, or predict the outcome of a workflow. The simulation engine can also evaluate possible workflow output and performance/scheduling parameters, and using such information, it can adaptively configure one or more workflow processes in accordance with business rules and heuristics and to implement preferred state changes and optimize performance and scheduling results in the workflow. The following provides an example of the simulation engine modifying a workflow process definition. Suppose a workflow process contains a business rule for expense claims that states "(if amount >10,000) then reroute claim for manager approval." Ideally, the amount value would be set as high as possible so that the manager does not get involved and thereby increase the financial overhead of processing a claim, yet not so high as to incur risk. Determining appropriate threshold values for business rules is normally performed manually by the workflow designer by comparing other workflow values. In an embodiment, properties such as user, item, location, and so forth can all affect the threshold value. The simulation engine would run many different scenarios in the background to determine what the optimal threshold value would be. This is done by setting the threshold to an initial value for the first iteration and then modifying it after each additional iteration based on other output values. Finally, the new threshold value could be applied to the business rule.

The facility can employ a simulation engine to anticipate workflow response patterns to prompt client activities or to obtain workflow input via other servers, such as other document servers. The facility can employ standard communications methods (e.g., voicemail, e-mail, instant messaging, PPG SMS, fax, fax over IP, Internet or web protocols) to obtain workflow input or to provide output. The following provides an example of optimizing resource allocation. The simulation engine can execute (e.g., in the background) one or more scenarios to determine the minimum number of users that are required for each role in the workflow. Accounting for time, cost, and resource bottlenecks, the simulation can run one or many iterations of the scenario making adjustment each time to try and optimize when resources are used. The simulation engine could then return a list of the users for each role to be used across one or more workflows.

Custom Actions Applied to the Workflow Application

The workflow envelope may also interact with other, specialized programs using standard application programming interfaces (APIs) or web services, as well as modifications to the workflow application made by using the workflow development environment. As an example, custom actions or custom activities may be created to provide specialized input or processing steps not generally available in an application that is created using object libraries that are intended for the creation of common steps in a workflow process. Decision-making applications often require comparison with external data or have dependencies on other business conditions or approval steps, which a general purpose program cannot anticipate. Methods used to generate and associate a custom action with a specific workflow are set forth in the assignee's U.S. patent application Ser. No. 10/938,396, entitled "Custom and Customizable Components, Such As For Workflow Applications," filed on Sep. 10, 2004, and incorporated herein by reference in its entirety.

Custom actions or custom activities can be programmed using custom action workflow program developers' tools. Custom actions can include a modification in the workflow envelope, such as to change workflow process tasks, route documents to specified resources, change data associated with a dynamic document, and so forth. As an example, a custom action can specify a document view that is delivered to the end user.

Unified Environment

Figure 2:
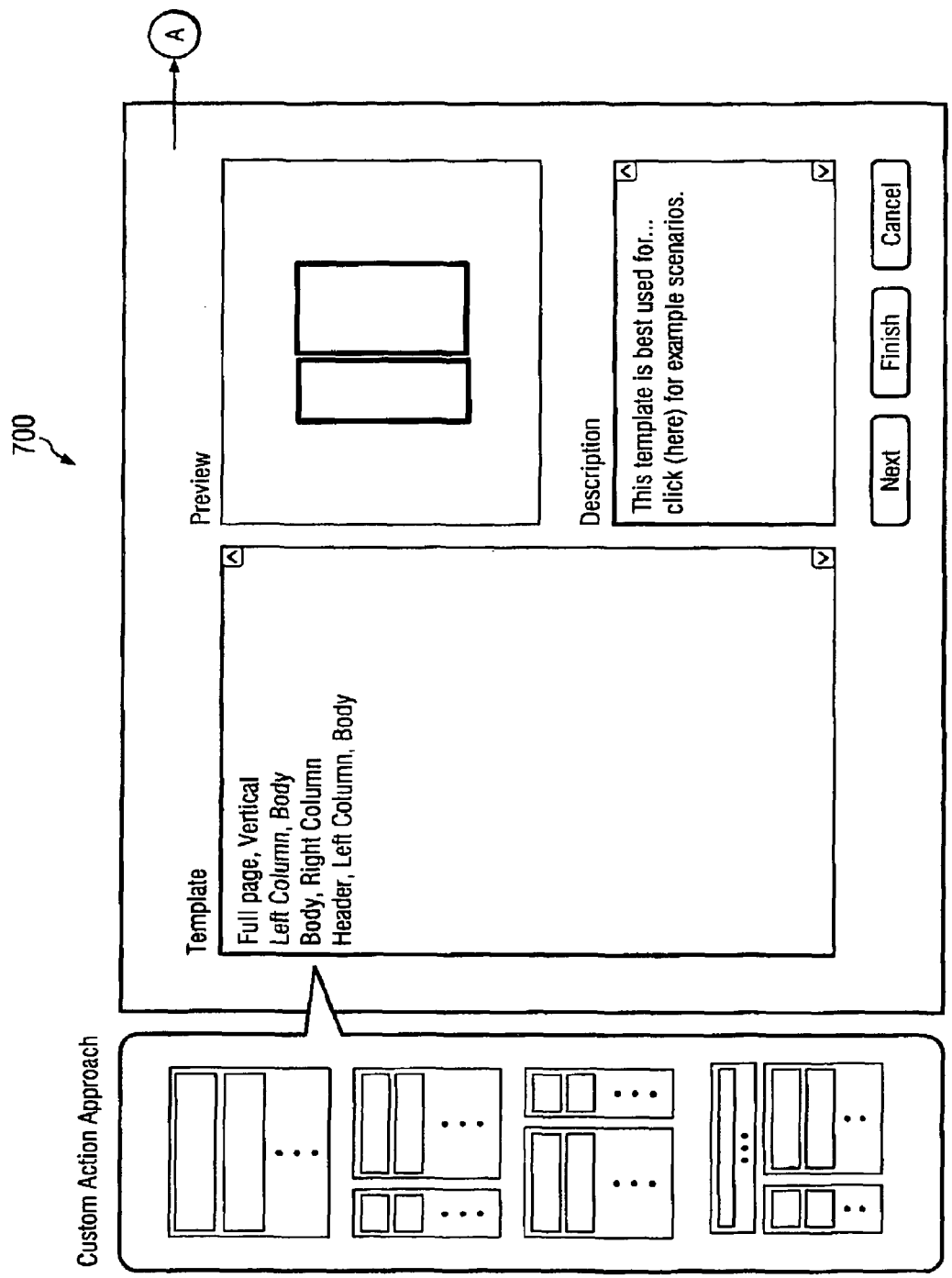
FIGS. 2-6 are user interface diagrams illustrating aspects of a user interface associated with a workflow facility in some embodiments.
Figure 3:
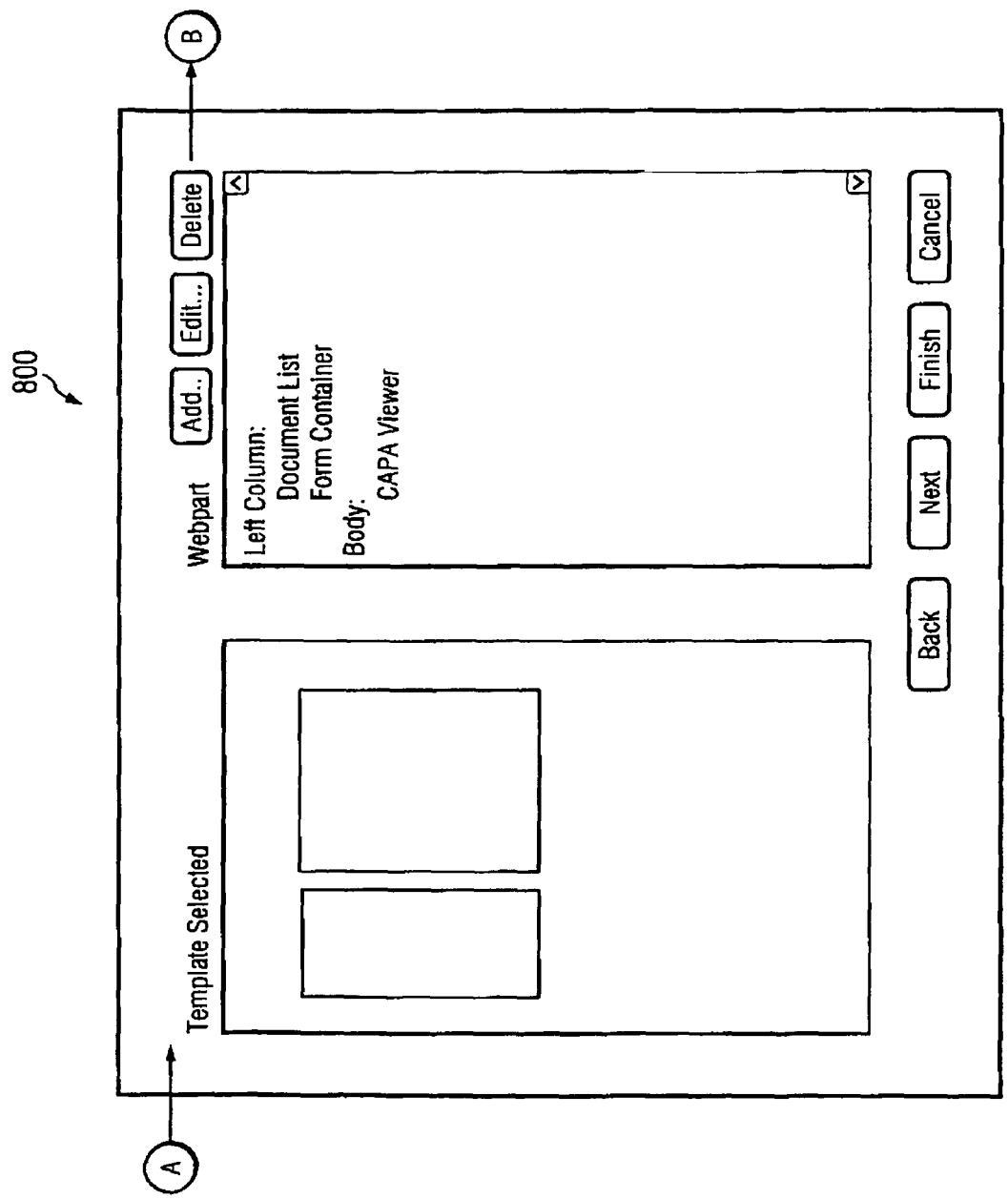
Figure 4A:
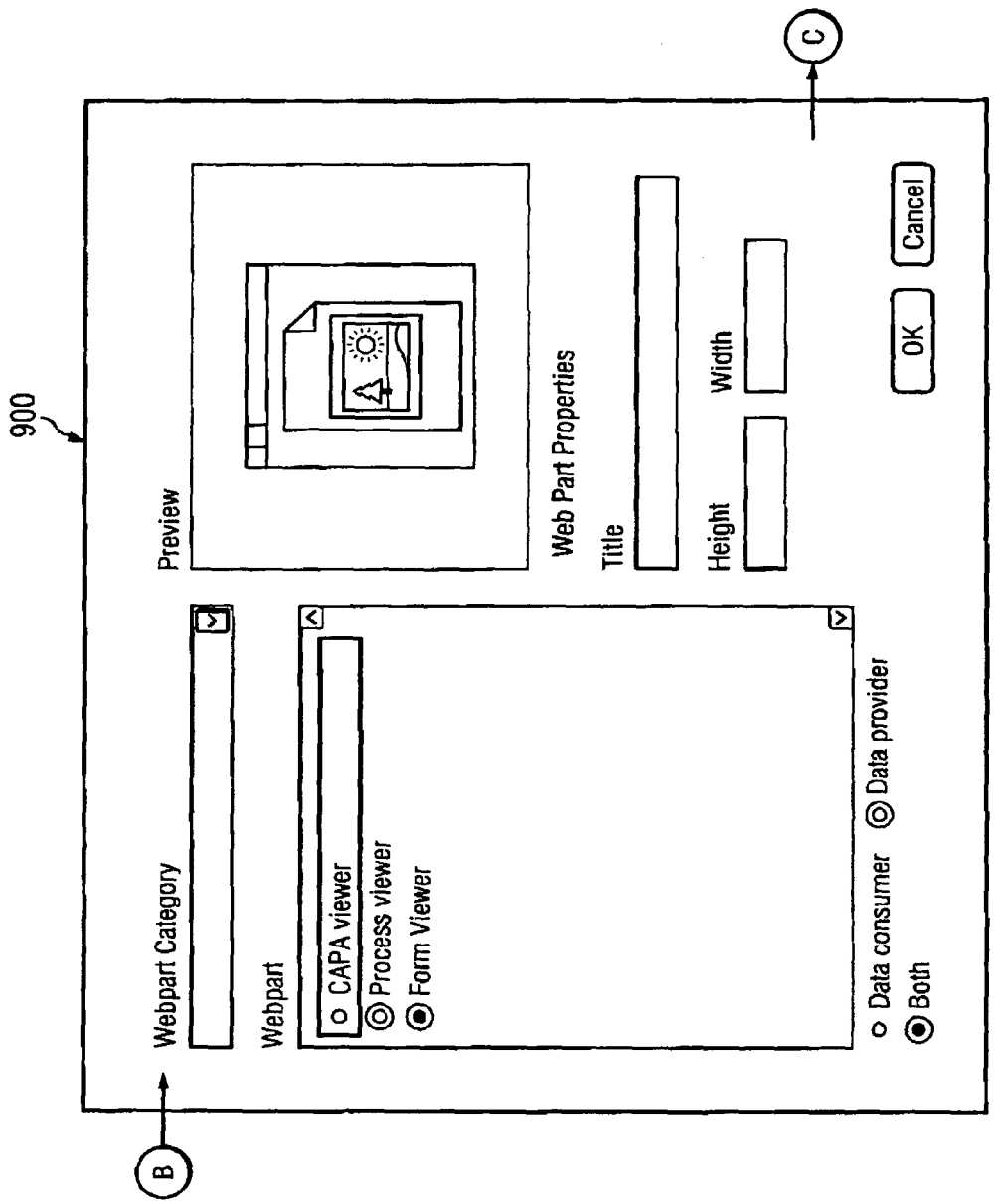
Figure 4B:
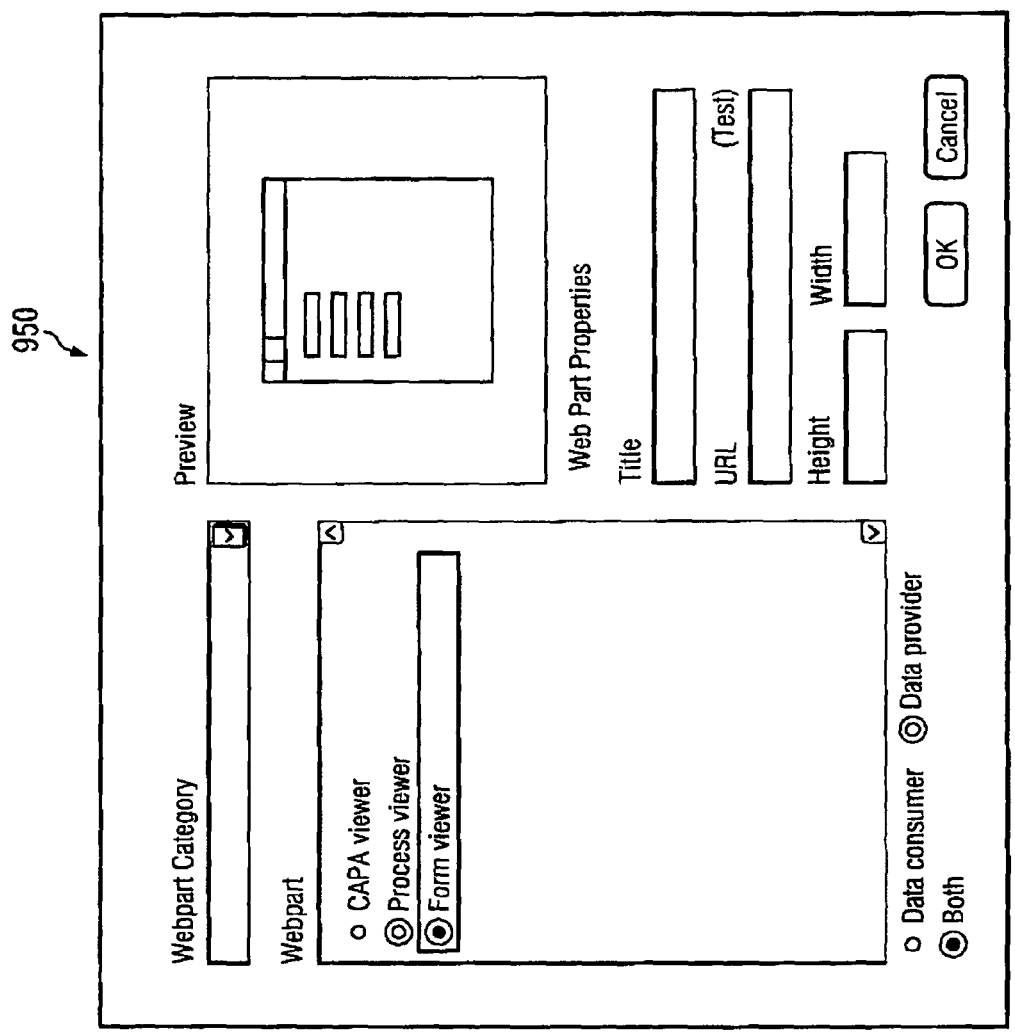
Figure 5:
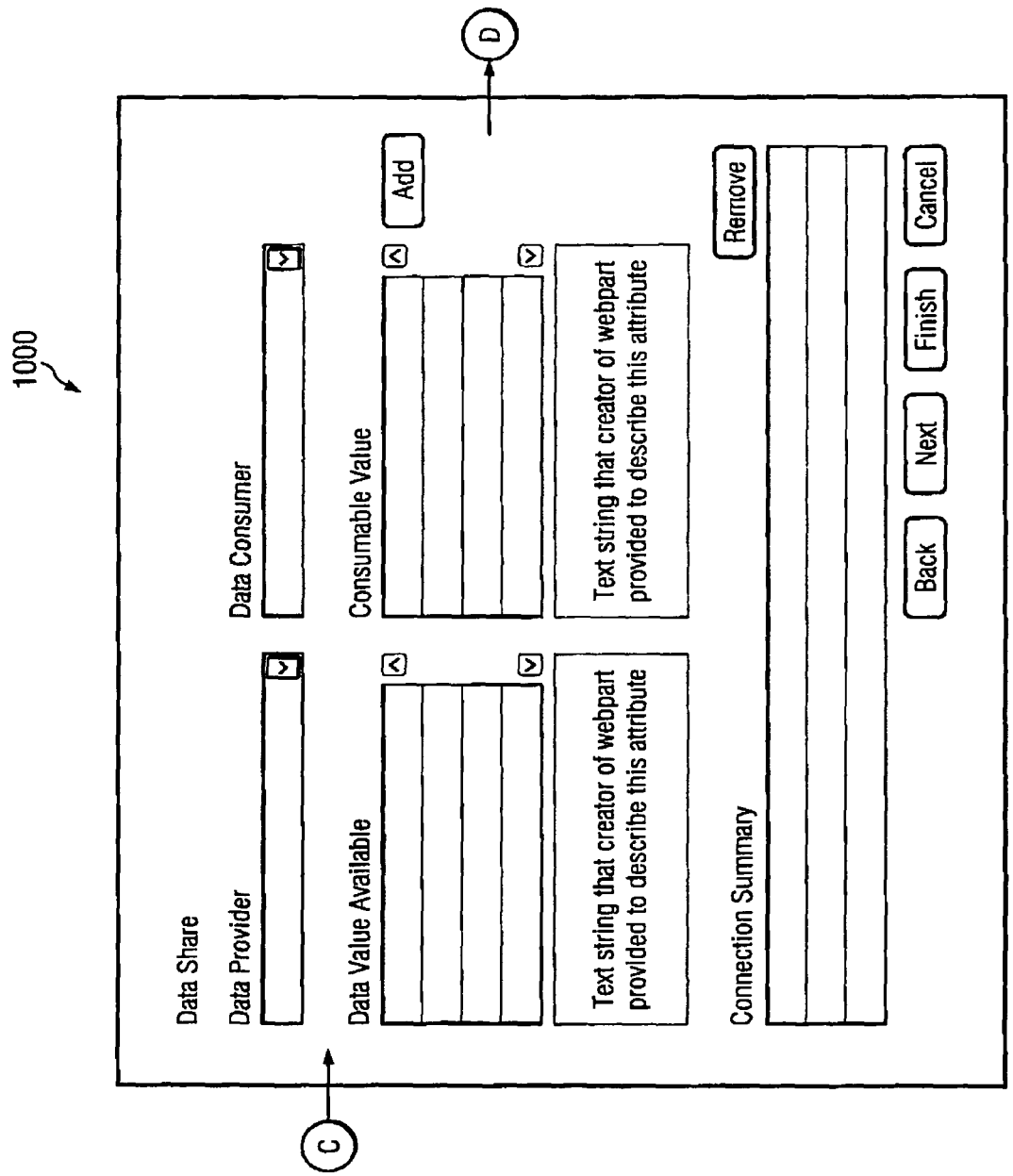
Figure 6:
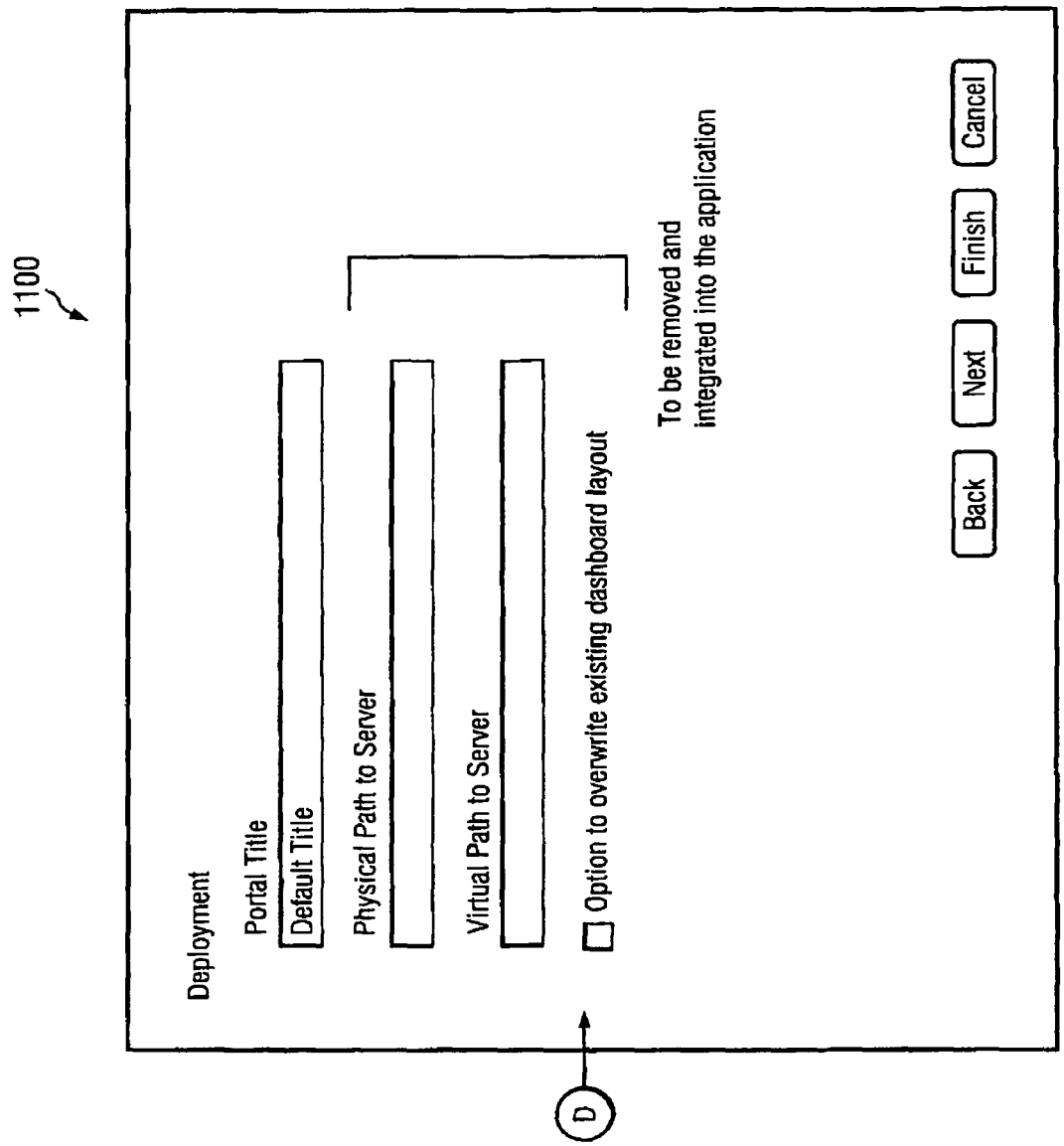

The facility can have an associated user interface that separates tasks from documents. FIGS. 2-6 are user interface diagrams illustrating aspects of a user interface associated with a workflow facility in some embodiments, and which illustrate aspects of this feature. These figures are related sequentially using encircled letters A, B, C, and D. User interface 700 of FIG. 2 illustrates a custom action approach to creating workflow. Using this user interface, the user can select a template and view a preview of the template. When the user selects a Next pushbutton, the user interface displays panel 800 illustrated in FIG. 3. In this user interface, the user can select web parts to add. When the user selects a Next pushbutton, the user interface displays a panel 900 or 950 illustrated in FIG. 4A or 4B, respectively. Using the user interface illustrated in FIGS. 4 and 4B, the user can then select a webpart category and a webpart for addition to the user interface user defines. A webpart is a customization tool that affects the appearance and content displayed in a workspace, such as in a form. Examples of webparts are various viewers, such as for workflow processes and related forms, and data-bound fields that retrieve information from a data store and display the information. The user can specify properties relating to webparts the user adds. Upon selecting a Next pushbutton, the user interface displays a panel 1000 illustrated in FIG. 5. Using the user interface illustrated in FIG. 5, the user can provide additional properties relating to webparts, such as data providers (e.g., data sources), data consumers (e.g., webparts), and so forth. When the user selects a Next pushbutton, the user interface displays panel 1100 illustrated in FIG. 6. Using the user interface illustrated in FIG. 6, the user can deploy a workflow application, such as by specifying a title, path, and so forth.

Figure 7:
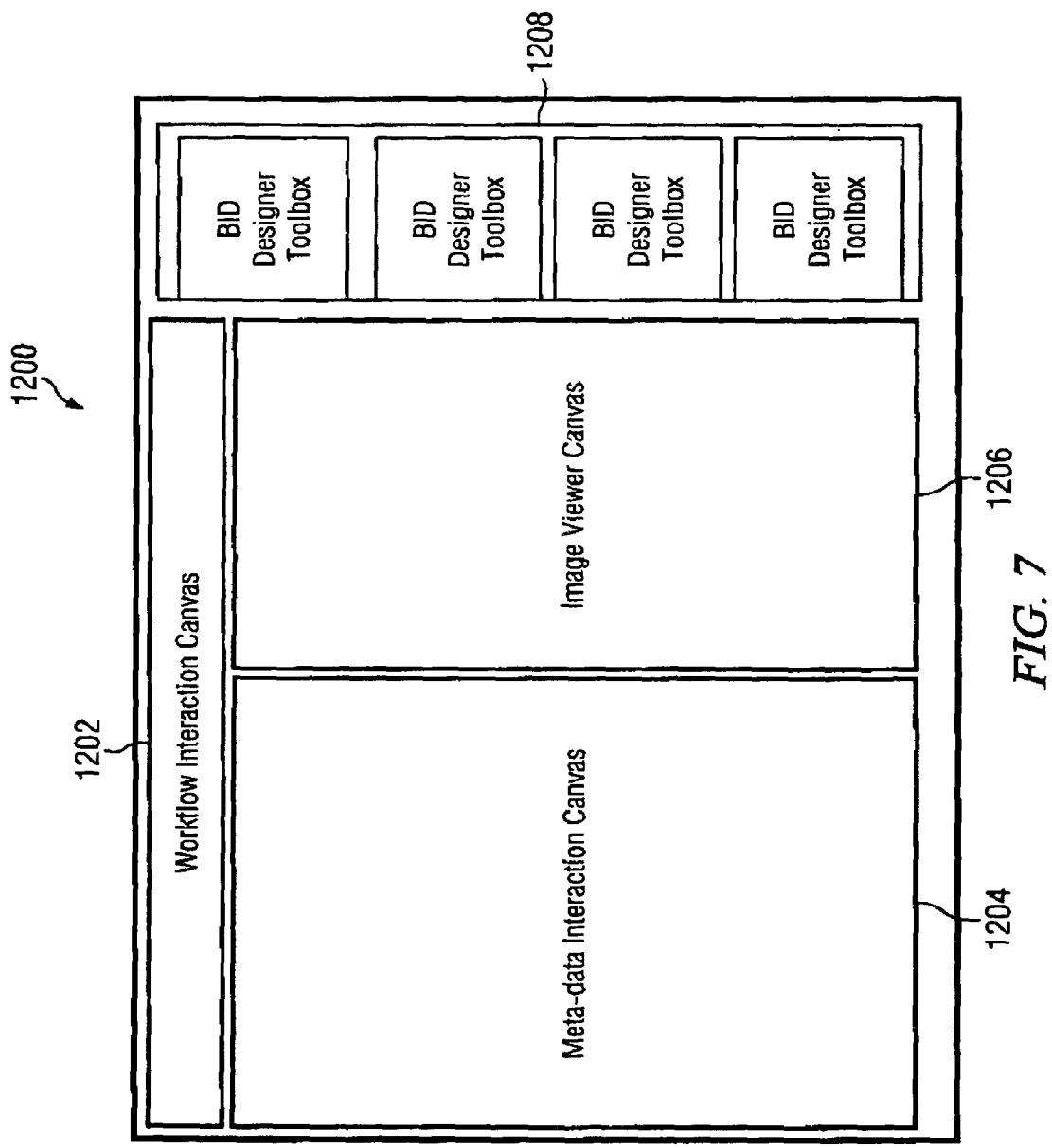
FIG. 7 is a user interface diagram illustrating a set of interactive canvases associated with the workflow envelope in various embodiments.

FIG. 7 is a user interface diagram illustrating a set of interactive canvases associated with the workflow envelope in various embodiments. The user interface 1200 illustrates a workflow interaction canvas 1202, metadata interaction canvas 1204, and image viewer canvas 1206. The workflow interaction canvas can contain workflow process tasks. These workflow process tasks can be data-bound, meaning that information from a data store can determine whether the user can perform a task. The metadata interaction canvas can provide data fields that a user can employ to add or modify data associated with a workflow process or task. When the user enters data or changes it, a document appearing in the image viewer canvas can automatically update with the entered or changed data. Thus, for example, a user that is accustomed to seeing paper forms can quickly verify whether data is correctly entered by viewing the updated document in the image viewer canvas.

The user interface also illustrates multiple designer toolboxes 1208 that can be employed by business information developers ("BIDs"). The toolboxes provide user interface elements associated with workflow processes that a user can drag and drop onto the various canvases, such as the metadata interaction canvas.

Thus, the facility provides a three-pane application that business users can employ to lay out navigation, metadata, and so forth. When the application is run by a user, generated documents can be dynamically displayed in an image viewer canvas.

Figure 8:
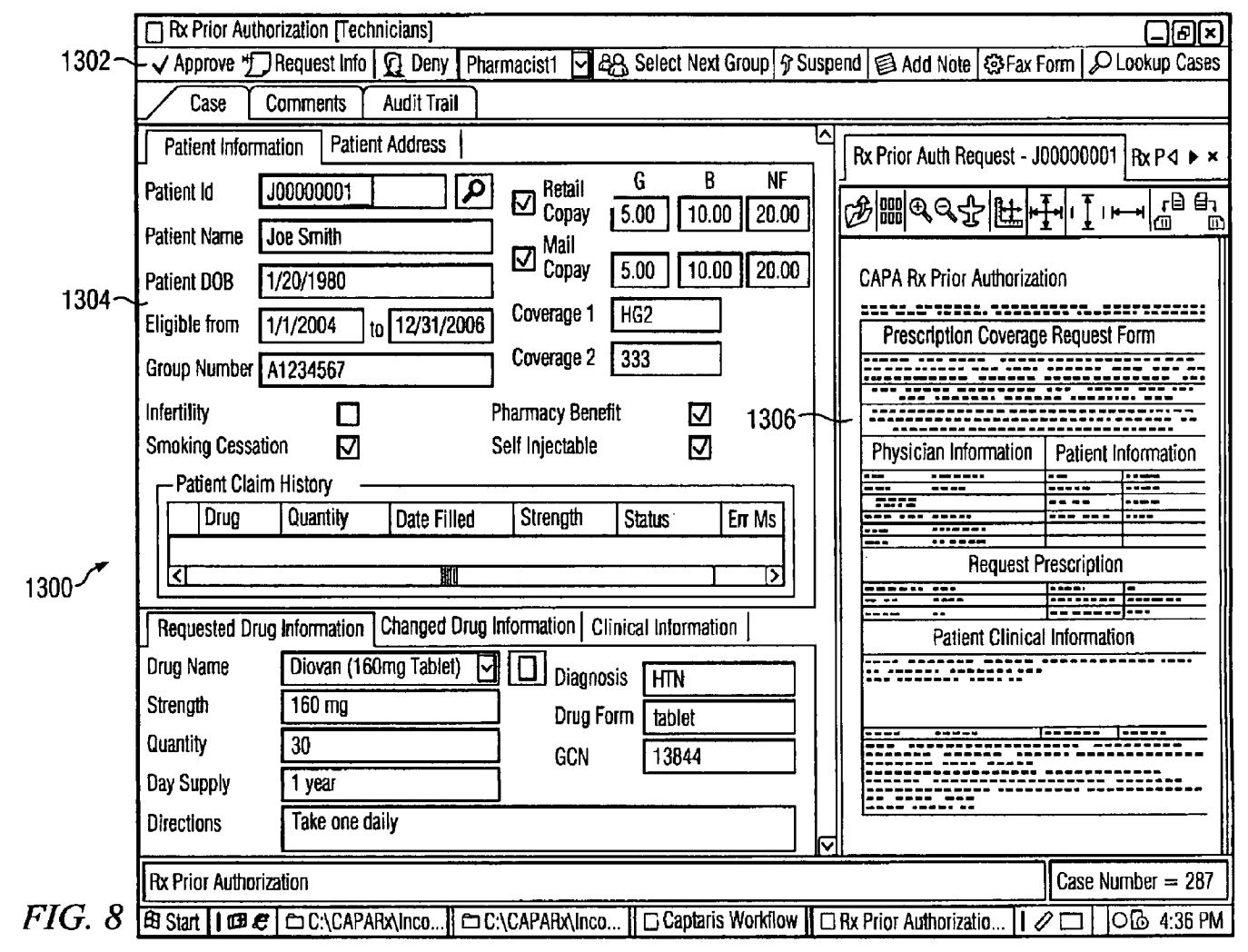

A specific implementation of the generic user interface illustrated in FIG. 7 is provided in FIG. 8, which is a user interface diagram illustrating a user interface associated with a workflow application. The specific implementation illustrates a workflow application that is associated with health care treatment and prescription approvals. The user interface 1300 includes workflow actions in workflow interaction canvas 1302, forms for entering or viewing various patient or drug-related information in metadata interaction canvas 1304, and a prescription viewer in image viewer canvas 1306. The environment can contain components that may be used and displayed in a number of different workflows, such as the metadata browser. In the illustrated embodiment, the workflow component includes a view of a task's execution options based on the workflow model, the user role, and the current workflow task. The figure illustrates the richness of the deployed application—metadata, forms, workflow management, document viewer are all operating in the runtime deployment. A knowledge worker is the typical user of this workflow application.

CONCLUSION

Various embodiments of the technology are described above. The description provides specific details for a thorough understanding and enabling description of these embodiments. One skilled in the art will understand, however, that the technology may be implemented or practiced without many of these details. Additionally, some well-known structures or functions may not be shown or described in detail, so as to avoid unnecessarily obscuring the relevant description of the various embodiments.

The terminology used in the description is intended to be interpreted in its broadest reasonable manner, even though it is being used in conjunction with a detailed description of identified embodiments.

In general, the detailed description of the embodiments is not intended to be exhaustive or to limit the claims appended hereto to the precise form disclosed above. While specific embodiments and examples are described above for illustrative purposes, various equivalent modifications are possible, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Aspects of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the technology reside on a server computer, while corresponding portions reside on a client computer such as a mobile or portable device, and thus, while certain hardware platforms are described herein, aspects of the technology are equally applicable to nodes on a network.

The teachings provided herein can be applied to other systems, not necessarily the system described herein. The elements and acts of the various embodiments described herein can be combined to provide further embodiments.

Any patents, applications and other references, including any that may be listed in accompanying filing papers, are incorporated herein by reference. Aspects of the described technology can be modified, if necessary, to employ the systems, functions, and concepts of the various references described above to provide yet further embodiments.

These and other changes can be made in light of the above Detailed Description. While the above description details certain embodiments and describes the best mode contemplated, no matter how detailed, various changes can be made. Implementation details may vary considerably, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the claims to the specific embodiments disclosed in the specification, unless the above Detailed Description section explicitly defines such terms. Accordingly, the actual scope of the claims encompasses not only the disclosed embodiments, but also all equivalents.

We claim:

1. A system for enabling workflow applications, comprising:
   at least one computer;
   a workflow envelope containing at least two objects associated with a workflow process having multiple workflow process tasks defined for the workflow envelope, wherein the at least two objects are of different types, wherein at least one of the multiple workflow process tasks is capable of operating on a dynamic object in the workflow envelope;
   a workflow metrics store that stores metrics relating to the workflow process with which the workflow envelope is associated;
   a resource pool having a set of resources that are capable of completing the multiple workflow process tasks of the workflow process;
   a workflow simulation engine component configured to compute an optimized resource list for completing an identified workflow process task from the multiple workflow process tasks, wherein in computing the optimized resource list, the workflow simulation engine component employs models and historical data stored in the workflow metrics store, and runs multiple scenarios to identify, utilizing a plurality of optimization criteria, a subset of the set of resources from the resource pool that are capable of completing the identified workflow process task from the multiple workflow process tasks of the workflow process with which the workflow envelope is associated, wherein the plurality of optimization criteria includes constraints determined from data provided by the metrics; and a workflow engine component configured to:
receive from an application a request for the optimized resource list to complete the identified workflow process task, which operates on one or more objects contained in the workflow envelope,
request the workflow simulation engine component to compute the optimized resource list,
execute the identified workflow process task employing the identified subset of the set of resources from the resource pool, and
store in the workflow metrics store metrics data about the identified workflow process task having been executed.

2. The system of claim 1 further comprising a security component configured to interpret metadata stored in the workflow envelope and relating to one of the at least two objects so that the workflow envelope can be propagated.

3. The system of claim 1 further comprising a data source component configured to provide forms and templates relating to the workflow process.

4. The system of claim 1 further comprising a data source component configured to provide forms and templates relating to the workflow process and operable to propagate workflow envelopes associated with the workflow process.

5. The system of claim 1 wherein one of the at least two objects is a dynamic object configured to retrieve information from a data source.

6. The system of claim 1 wherein the workflow engine is configured to cause the workflow envelope to accumulate an object during a task of the workflow process.

7. The system of claim 1 further comprising a security component configured to encrypt or decrypt a document the workflow envelope contains.

8. The system of claim 1 further comprising a set of webparts, each webpart associated with a type of document.

9. The system of claim 1 further comprising a unified workflow development environment configured to facilitate development of a workflow process by providing a drag and drop canvas, inspection of data objects, automated synchronization of workflow changes, and enable access to the at least two objects of at least two different types.

10. A method for enabling workflow applications, comprising:
identifying a workflow envelope, the workflow envelope containing at least two objects and specifying, in association with a workflow process, a set of workflow process tasks relating to the at least two objects, wherein the at least two different objects are of different types, wherein at least one of the set of workflow process tasks is capable of operating on a dynamic object in the workflow envelope;
at a workflow engine, receiving from a client application a request for an optimized resource list for performing an identified workflow process task from the set of workflow process tasks specified in the identified workflow envelope;
providing an indication of the received request to a simulation engine operating on a computer;
running multiple scenarios on the simulation engine on the computer to identify, based on a plurality of optimization criteria, a set of resources from a resource pool that are capable of performing the identified workflow process task from the set of workflow process tasks specified in the identified workflow envelope, wherein input parameters of the simulation engine are populated using models and historical data stored in a workflow metrics stor, and wherein the plurality of optimization criteria includes constraints determined from data provided by metrics stored in the workflow metrics store;
providing the optimized resource list containing the set of resources identified by the simulation engine to the client application; and
employing a resource from the list of resources contained in the optimized resource list to perform the identified workflow process task specified in the identified workflow envelope, wherein the identified workflow process task operates on one or more objects in the workflow envelope utilizing the optimized resource list.

11. The method of claim 10 further comprising storing metrics data about the performed workflow process task in the workflow metrics storage.

12. The method of claim 10 further comprising developing a workflow application in a unified environment that enables developers to develop, deploy, and use workflow applications.

13. The method of claim 10 further comprising developing a workflow application in a unified environment that enables developers to develop, deploy, and use workflow applications, and deploying the developed workflow application.

14. The method of claim 10 wherein performing the identified workflow process task includes interacting with a web service via a custom action.

15. The method of claim 10 wherein performing the workflow process task includes interacting with a specified application via a custom action that invokes an application program interface provided by the specified application.

16. A computer program product comprising at least one non-transitory computer-readable medium storing computer-executable instructions that, when executed, cause a computer system to perform a method for enabling workflow applications, the method comprising:
at a simulation engine, receiving from a workflow engine a request to identify an optimized resource list for performing a workflow process task, wherein the workflow process task is one of multiple workflow process tasks, which are associated with a workflow process and defined for a workflow envelope, the workflow envelope storing multiple objects of at least two different types, wherein at least one of the multiple workflow process tasks is capable of operating on a dynamic object in the workflow envelope;
populating input parameters of the simulation engine employing modeling and historical data from a workflow metrics data source;
identifying, from a resource pool of resources that are capable of performing the workflow process task defined for the workflow envelope to operate on one or more objects in the workflow envelope, a set of resources best matching the request from the workflow engine by running multiple scenarios on the simulation engine utilizing a plurality of optimization criteria, wherein the plurality of optimization criteria includes constraints determined from data provided by metrics stored in the workflow metrics data source; and providing the optimized resource list containing the set of resources identified by the simulation engine to the workflow engine, wherein the workflow process task operates on the one or more objects associated with the workflow envelope utilizing the optimized resource list; and executing the workflow process task by employing the set of resources of the optimized resource list.

17. The computer program product of claim 16 wherein the plurality of optimization criteria includes load optimization criteria and wherein the load optimization criteria comprises at least one of load, time, and cost.

18. The computer program product of claim 16 wherein the workflow envelope contains two documents of two different types and wherein the identifying includes identifying resources capable of performing workflow tasks associated with each of the two different document types.

19. The computer program product of claim 16 further comprising identifying workflow response patterns so that a workflow process task can be reassigned.

20. The computer program product of claim 16 further comprising predicting outcome of a workflow based on the historical data and stored workflow metrics data.

* * * * *